United States Patent Office 3,632,570
Patented Jan. 4, 1972

3,632,570
POLYSACCHARIDE PROCESS
James W. Gill, Heritage Park, Del., assignor to Hercules Incorporated, Wilmington, Del.
No Drawing. Filed Sept. 19, 1968, Ser. No. 761,005
Int. Cl. C12b 1/00
U.S. Cl. 260—209 R
5 Claims

ABSTRACT OF THE DISCLOSURE

Process of producing a complex polysaccharide in a carbohydrate aqueous media with the microorganism *Arthrobacter stabilis* nov. spec. NRRL B-3225.

---

This invention relates to a new and useful polysaccharide and to a process of producing same by fermentation.

The complex or heteropolysaccharide of the present invention has several uses including that of thickening and suspending agents. As compared with conventional polysaccharides, it is stable to an unexpected high degree in the presence of salts, acids and cations.

The present invention provides a complex polysaccharide produced by the process of cultivating the microorganism NRRL accession No. B-3225 under submerged aerobic conditions in an aqueous carbohydrate solution containing a nitrogenous nutrient. Fermentation temperatures and times respectively are about 20° C.–35° C., preferably 22° C.–32° C., 28° C.–30° C. being specifically preferred, for 1–6 days, temperature and time varying inversely.

A culture of the microorganism used in producing the polysaccharide of this invention has been deposited in the reserved strain category of the Northern Regional Utilization Research Laboratories U.S. Department of Agriculture (NRRL), of Peoria, Ill. and given the NRRL acession No. B-3225 pending patent status.

Applicant isolated the microorganism of the present invention from soil. Based on studies and tests, given in detail hereinafter, which applicant made in order to better identify the microorganism employed in this invention, perhaps the best designation for the microorganism as to genus is Arthrobacter; however it is substantially different in a number of important respects from the known species of the Arthrobacter genus and for this reason one may wish to designate the particular microorganism of this invention as "*Arthrobacter stabilis*, nov. sp. NRRL B-3225". The microorganism of this invention is described by the following characteristics.

Gram reaction—Negative.
Morphology—Large, pleomorphic rods with some apparent branching when young; small rods later, changing to coccoid forms after about one week, including a few very large cells.
Flagellation—Motile by one to three peritrichous flagella.
Inclusions—Poly-β-hydroxybutyrate inclusions generally present.
Gross appearance—Cultures chalky-white, raised, glistening, potato growth less, mucoid, tan.
Physiological reactions—Aerobic; catalase negative; urease positive; no growth on Koser's Citrate broth; growth good on nitrate broth; no liquifaction of gelatin (Difco nutrient); no hydrolysis of starch; hydrogen sulfide produced from cysteine; optimum temperature 28° C.–30° C., no growth at 37° C.; litmus milk reduced and digested slightly.
Fermentative reactions—No gas produced; slight acid production with glucose, sucrose, lactose, mannose and mannitol. Slightly basic reaction with arabinose.
Isolated from rich soil.

The following examples illustrate various embodiments of the present invention but they are not intended to limit the invention beyond the scope of the claims of this application.

EXAMPLE 1

Microorganism NRRL B-3225 was grown in Medium B of Example 3, which was nearly identical to the production media described below, for one day at 28° C. on a rotary shaker. This culture was used to inoculate (3% v./v.) a series of twenty flasks which contained the following medium (100 ml. per 500 ml. Erlenmeyer flask) supplemented with separate additional amounts of the ingredients or adjusted to pH values from 6.0 to 6.9.

| | Percent |
|---|---|
| Vitamin-free casamino acids (Difco Laboratory) | 0.02 |
| NaNO$_3$ | 0.12 |
| KH$_2$PO$_4$ | 0.08 |
| Mg·SO$_4$·7H$_2$O | 0.08 |
| Ca(NO$_3$)$_2$·4H$_2$O | 0.06 |

Plus KOH to adjust the pH to 6.6–6.9.

Percent concentration is on a weight per volume basis. After incubation on a New Brunswick rotary shaker at 25° C.–28° C. for 4 days, the cultures were found to have viscosity values of from 3100 cps. to 4400 cps. (Brookfield model LVF viscometer with spindle No. 4 at 30 r.p.m. and 22° C.). The pH values at this time were from 7.0 to 5.5. These broths were pooled and 100 grams thereof was diluted with an equal amount of water, and then an excess of a quaternary ammonium salt was added to precipitate the polysaccharide. The polysaccharide-quaternary complex was removed and washed on a 200-mesh sieve, well drained of excess water, and slurried in a Waring Blendor with about 500 ml. of isopropyl alcohol (IPA) containing 0.25% potassium acetate. The quaternary compound was thereby washed away, leaving the polysaccharide as the potassium salt. The polysaccharide was then similarly washed in fresh potassium acetate in IPA, then with plain IPA, finally with acetone, and then dried at 37° C. for about 1 hour, at which time the acetone odor was gone. A yield of 1.25 grams of polysaccharide was obtained, which contained a small amount of occluded cell material. Most of the cells had remained in the supernatant solution during the initial precipitation.

The polysaccharide was dissolved in 100 ml. distilled water to give a solution viscosity of 2200 cps. Upon the addition of 1.0 gram NaCl the viscosity rose to 4200 cps.

The particular quaternary ammonium salt used in this Example 1 may be represented by the formula

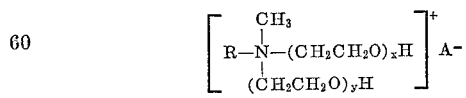

wherein R was predominantly stearic acid, wherein A⁻ was chloride and wherein the sum of x and y was about 15.

EXAMPLE 2

Cells of a culture of microorganism NRRLB-3225 grown on nutrient Agar (Difco) plus 0.1% each of glucose and yeast extract (Difco) were suspended in sterile water, and then inoculated into flasks of a vitamin-glucose-salts medium (yeast carbon base, Difco, plus glucose to 3.5%) at pH 6.7 supplemented separately with the indicated nitrogen sources (0.20% w./v. each). After two days of incubation on a rotary shaker at 26° C., the following culture turbidity, viscosity and pH values were measured.

| Nitrogen source | Turbidity [1] | Viscosity, cps. | pH |
| --- | --- | --- | --- |
| (a) Vitamin-free casamino acids (Difco) | 110 | 1,000 | 4.9 |
| (b) Monosodium glutamate | 146 | 3,200 | 7.0 |
| (c) Sodium nitrate | 135 | 3,200 | 8.0 |

[1] Klett Summerson Units of broth diluted 10X with water.

About 40 grams of broths (b) and (c) were precipitated by the addition of several volumes of ethanol, the precipitates were washed with plain ethanol and then with acetone, and then dried at 37° C. The impure polysaccharides were weighed and found to represent (b) 1.08% and (c) 0.97% of the original broths.

EXAMPLE 3

10 liters of medium A below was inoculated with 100 ml. of culture NRRL B-3225 grown 1 day in medium B below on a rotary shaker at 28° C. The inoculated medium, in a 14-liter fermentation design fermentor, was agitated and aerated for 5 days according to the schedule shown below. A thin-bladed helical stirrer was used.

| Day | 1 | 2 | 3 | 4 | 5 |
| --- | --- | --- | --- | --- | --- |
| Temperature (° C.) | 21 | 21 | 21 | 27 | 27 |
| Aeration, v./v./min | 0.1 | 1.0 | 1.0 | 1.0 | 1.0 |

2 ml. of peanut oil was added during the first day as an antifoam agent. At the end of the 5 day incubation the viscosity of the broth was 4800 cps. and the pH was 8.0. The impure polysaccharide concentration was about 1.2% by weight of the original broth. The medium formulations were (percent is w./v.):

| | A | B |
| --- | --- | --- |
| Vitamin-free casamino acids, percent | .02 | .02 |
| NaNO$_3$, percent | .18 | .12 |
| KM$_2$PO$_4$, percent | .12 | .08 |
| MgSO$_4$·7H$_2$O, percent | .12 | .08 |
| Ca(NO$_3$)$_2$·4H$_2$O, percent | .09 | .06 |
| MnSO$_4$·4H$_2$O, p.p.m | 32 | 40 |
| FeSO$_4$·7H$_2$O, p.p.m | 10 | 50 |
| Cerelose (glucose hydrate), percent | 3.3 | |
| pH by KOH addition | 6.6 | 6.5 |
| Glucose, percent | | 2.0 |

Recovery of the product was by means of the quaternary precipitation of Example 1. A 1.0% solution of this polysaccharide in distilled water had a viscosity (Brookfield LVF, Spindle No. 4 at 30 r.p.m. and 25° C.) of 1580 cps. which was raised to 4800 cps. by the addition of 1.0% sodium chloride.

EXAMPLE 4

A 10 liter volume of broth in a 14 liter fermentor jar was inoculated with 200 ml. of 1 day old inoculum (Medium B, Example 3), and incubated at 22° C. for 4 days. No stirring was used, except that provided by the passage of sterile air at the rate of 2.0 v./v./min. Evaporation reduced the final volume to about 7.5 liters of broth, which had a viscosity of 4400 cps. measured as in Example 3 and a pH of 7.2. The polysaccharide product was obtained in a concentration of about 1.1% by weight of the final broth. The broth composition was the same as Medium A, Example 3, except that 3.0% cerelose was used instead of 3.3%.

The conditions of the fermentation, other than the particular microorganisms employed (and of course the polysaccharides produced), are not per se a part of the present invention since well-known, conventional means are quite suitable. The optional but preferred technique of recovering the polysaccharide by agitating the fermentation broth containing same in the presence of a polyethoxylated quaternary ammonium compound although new is not per se a part of the present invention. This precipitates the polysaccharide complexed with the polyethoxylated quaternary ammonium compound and leaves behind the spent microbial cells. For the sake of clarity and completeness an example of this recovery technique will now be given.

100 ml. of the microbial polysaccharide fermentation broth from a fermentation of *Arthrobacter stabilis* NRRL B-3225 of the present invention (which had a polysaccharide concentration of about 1.2% and a viscosity of about 6000 cps.) was diluted with 1 volume of distilled water. To 200 ml. of the diluted fermentation broth was added with stirring 20 ml. of a 20% aqueous solution of stearyl di(polyoxyethylene) methyl ammonium chloride. The precipitate which formed, i.e. the microbial polysaccharide complexed with the stearyl di(polyoxyethylene) methyl ammonium chloride, was separated from the supernatant by filtration. The complex was washed once with about 1 liter of water. The washed complex was then agitated (extracted) twice with 300 ml. portions of IPA having dissolved therein 0.15% potassium acetate, followed by washing once with 300 ml. of IPA alone and finally once with 300 ml. of acetone. The microbial polysaccharide product thus obtained was dried in a vacuum oven at 37° C. to give 1.2 grams of product, a 100% recovery. The microbial polysaccharide product was dissolved in 100 ml. of a 1.0% aqueous solution of sodium chloride, and the viscosity was measured and found to be 4200 cps.[1] The supernatant resulting from precipitating with stearyl di(polyoxyethylene) methyl ammonium chloride was cloudy, which is further evidence that it precipitated the microbial polysaccharide and left behind suspended in the supernatant substantially all of the microbial cells. The precipitate was soft and coalescent and separated with ease from the supernatant simply by filtering. Likewise no difficulty was encountered in further processing the precipitate.

The polyethoxylated quaternary ammonium compound precipitants applicable as an optional but preferred means of recovering the polysaccharides of the present invention are those with the general structural formula

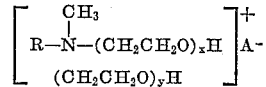

The R moiety in this formula may be a stearyl group, oleyl group, or a mixture of "fatty" groups such as those found in coconut oil and other natural oils such as for example peanut and corn oil. The sum of $x$ and $y$ (i.e. the total oxyethyl units) in this formula may be about 7–23, but preferably is about 15. A$^-$ in this formula may be any conventional anion such as e.g. chloride, acetate, nitrate, sulfate, etc.

The ratio of polyethoxylated quaternary ammonium compound precipitant to microbial polysaccharide employed is not critical but preferably is about 0.4/1–2/1, 1/1 being specifically preferred. Higher concentrations than 2/1 can be used but to no substantial advantage in most cases. Lower concentrations than 0.4/1 give some precipitation but not as much as desired, and the recovery of the precipitate is hindered.

Means of dissociating the microbial polysaccharide-polyethoxylated quaternary ammonium compound complexes are known. In general the complexes may be dissociated by the same means heretofore used for dissociating prior art complexes of microbial polysaccharide with non-polyethoxylated quaternary ammonium compounds. Thus, they may be dissociated with (e.g. agitating the complexes in the presence of) an organic liquid having an

---

[1] Measured as in Example 3.

ionic compound dissolved therein in which resulting solution the polyethoxylated quaternary ammonium compound is substantially soluble and in which the complex and microbial polysaccharides are substantially insoluble thereby dissolving the polyethoxylated quaternary ammonium compound in said organic liquid. Typical organic liquids include e.g. methanol, ethanol, isopropanol, butanol, acetone, methyl ethyl ketone. Salts and acids in general are applicable ionic compounds. Typical and particularly suitable salts and acids include e.g. (1) alkali metal salts such as for instance the acetates and chlorides of sodium and potassium, and (2) acids such as for instance hydrochloric, phosphoric, sulfuric, chloroacetic.

Dilution of the fermentation broths prior to precipitation is not necessary but usually gives better results.

Whether or not the complex is dissociated and/or washed depends on the degree of purity desired in the final product and this in turn depends on the use to be made of the final product. All of these products have utility. Washing the complex with water alone gives some increase in purity, however washing with an aqueous solution of one of the above precipitants gives a substantially greater increase in purity. Good results have been obtained when washing the complex with about a 0.2%–0.4% aqueous solution of the precipitants. However this concentration is not critical, and lower or higher concentrations can be used. Although not necessary, preferably the type agitator used during washing will be one which will give a relatively high shear such as e.g. a Waring Blendor.

Thus, in accordance with the present invention the polysaccharide product may be used in the crude state without separating from the fermentation broth, or it may be separated therefrom and used either before or after further purification or processing.

The fermentation process is carried out under submerged aerobic conditions in a substantially sterile environment. Well-known nutrient media are applicable, typical of which are those described hereinbefore. Constituents of the nutrient medium include a carbon source and a nitrogen source and usually these will be in amounts of 1%–6% and 0.05%–1.0% by weight of the total nutrient medium respectively. The nitrogen source may be either organic, inorganic, or any combination of both. Applicable carbon sources include e.g. glucose, fructose, maltose, sucrose, lactose, galactose. Also included may be sources of phosphate, potassium, calcium, magnesium, sulfate and trace elements, etc.

Important advantages of the present invention over the prior art include the simple composition of the nutrient media which may be used and the compatibility and viscostability of the polysaccharide with various solutes, e.g. salts, acids and cations.

The polysaccharide is water soluble, but is precipitated from water by the addition of 3 to 4 volumes of alcohol or acetone. The several tables to follow illustrate the relationships between polysaccharide solution concentration (weight percent), solution viscosity (cps.), and a variety of dissolved substances.

TABLE 1.—VISCOSITY [1] VS. POLYSACCHARIDE CONCENTRATION

| Polysaccharide concentration, percent | 0.50 | 1.00 | 1.50 | 2.00 | 3.00 |
|---|---|---|---|---|---|
| Viscosity in distilled water, cps | 900 | 2,800 | 3,600 | 6,300 | 8,000 |
| Viscosity in 1.0% NaCl soln., cps | 900 | 3,600 | 6,200 | 9,000 | 11,600 |

[1] Brookfield LVF Spindle No. 4 at 30 r.p.m. and 25° C.

TABLE 2.—VISCOSITY [1] VS. SHEAR RATE

| Brookfield LVF speed, r.p.m. | 60 | 30 | 12 | 6 |
|---|---|---|---|---|
| Viscosity in distilled water, cps | 830 | 1,280 | 2,250 | 4,560 |
| Viscosity in 1.0% NaCl soln., cps | 2,501 | 5,080 | 11,600 | 22,200 |

[1] 1.0% polysaccharide solution; Spindle No. 4 at 25° C.

TABLE 3.—VISCOSITY [1] VS. SOLUTION pH

| pH | 2.0 | 4.0 | 6.0 | 8.0 | 10.0 |
|---|---|---|---|---|---|
| Viscosity, cps | 5,000 | 3,800 | 2,500 | 2,600 | 1,800 |

[1] 1.0% polysaccharide solution, Brookfield LVF Spindle No. 4 at 30 r.p.m. and 25° C.

TABLE 4.—EFFECT OF HEATING SOLUTIONS OF POLYSACCHARIDE AT 121° C. FOR 15 MINUTES (AUTOCLAVE STERILIZATION)

| Solution (1.0% polysaccharide) | Results | Viscosity, cps. [1] Before | After |
|---|---|---|---|
| In distilled water | Lost 33% of viscosity | 1,500 | 1,000 |
| In 0.24% NaCl | Gained 36% of viscosity | 4,500 | 6,100 |
| In 3.0% NaCl | Gained 33% of viscosity | 4,800 | 6,400 |
| In 30% sucrose | Lost 35% of viscosity | 2,000 | 1,300 |

[1] Brookfield LVF Spindle No. 4 at 30 r.p.m. and 25° C.

TABLE 5

Materials which cause gelation or precipitation of polysaccharide when added to 1% aqueous solution of polysaccharide:

Aluminum sulfate
Ferric sulfate
Methylene blue

TABLE 6.—VISCOSITY STABILITY OF 1% AQUEOUS SOLUTION OF POLYSACCARIDE IN PRESENCE OF SOLUTIONS SHOWN

| Aqueous solutions | Viscosity, cps. Initial | After 7 days |
|---|---|---|
| 15% HCl | 3,300 | 2,000 |
| 2% CaCl$_2$ | 3,600 | 3,800 |
| 26% NaCl | 4,000 | 4,200 |
| 15% (NH$_4$)$_2$HPO$_4$ | 4,200 | 4,100 |
| 20% (NH$_4$)$_2$HPO$_4$ | 4,400 | 4,500 |

TABLE 7.—STABILITY OF POLYSACCHARIDE IN HOT BRINE SOLUTION

Solution: 0.25% polysaccharide in saturated NaCl solution
Sequential: Treatments and viscosity values (Brookfield LVF Spindle No. 3 at 30 r.p.m.)

| | | Viscosity, cps. |
|---|---|---|
| 1st step | Solution at 22° C | 300 |
| 2nd step | Solution at 82° C | 300 |
| 3rd step | Solution held at 82° C. for 24 hours then cooled to room temperature. | 340 |

TABLE 8

Effect of 5% NaOH on polysaccharide solution viscosity [1]

A solution of 1% polysaccharide in 5% NaOH had no appreciable viscosity. After standing 1 hour at room temperature the pH of the solution was adjusted to 1.5 by the addition fo 10% H$_2$SO$_4$ immediately following which the viscosity of the solution measured 2500 cps.

The polysaccharide of the present invention can be deacetylated by mixing it with alkali in alcohol; it does not dissolve and is easily washed free of excess alkali after the reaction has proceeded. For example, 1.00 gram portions of polysaccharide suspended in 8 oz. of 80% methanol-20% water containing 0.1 or 0.4 gram KOH, and incubated overnight at room temperature, were recovered in each case by filtration, washed with methanol and then acetone, and dried. Both samples had lost 0.10 gram of weight, 10% of their original weight. Solutions of the deacetylated polysaccharide showed approximately the same viscosity values as the native (non-deacetylated) polysaccharide in plain water and dilute salt solutions, and after heating the dilute salt solution at 121° C. for 15 minutes.

The identity of the portion of the polysaccharide which is removed by the above identified slurry-saponification has been proven to be acetate by preparing the benzylthiouronium salt of the recovered acid.

[1] Brookfield LVF Spindle No. 4 at 30 r.p.m. and 23° C.

The composition of the polysaccharide has been determined, by conventional chromatographic analysis of hydrolysates of the polysaccharide, to be approximately as follows on a monomer ratio basis: 6 moles of glucose, 2 moles of galactose, 4 moles of acetate, and 1 mole of uronic acid.

As many apparent and widely different embodiments of this invention may be made without departing from the spirit and scope thereof, it is to be understood that the invention is not limited to the specific embodiment thereof except as defined in the appended claims.

What I claim and desire to protect by Letters Patent is:

1. Process of preparing a complex polysaccharide comprising cultivating the microorganism *Arthrobacter stabilis* nov. spec. NRRL B-3225 under submerged aerobic conditions in an aqueous carbohydrate solution containing a nitrogenous nutrient.

2. Process of preparing a complex polysaccharide comprising cultivating the microorganism *Arthrobacter stabilis* nov. spec. NRRL B-3225 under submerged aerobic conditions in an aqueous carbohydrate solution containing a nitrogenous nutrient at a temperature of 20°–35°.

3. Process of preparing a complex polysaccharide comprising cultivating the microorganism *Arthrobacter stabilis* nov. spec. NRRL B-3225 under submerged aerobic conditions in an aqueous carbohydrate solution containing a nitrogenous nutrient at a temperature of 28° C.–30° C.

4. Process of preparing a complex polysaccharide comprising cultivating the microorganism *Arthrobacter stabilis* nov. spec. NRRL B-3225 under submerged aerobic conditions in an aqueous carbohydrate solution containing a nitrogenous nutrient at a temperature of 28° C.–30° C. and then recovering from the broth the polysaccharide thus produced.

5. The polysaccharide produced by the microorganism *Arthrobacter stabilis* nov. spec. NRRL B-3225, said polysaccharide having on a monomer basis the approximate composition of 6 mols glucose, 2 mols galactose, 4 mols acetate, and 1 mol uronic acid.

References Cited

UNITED STATES PATENTS 3,228,855   1/1966   Cadmus et al. _____ 195—31

A. LOUIS MONACELL, Primary Examiner

G. M. NATH, Assistant Examiner

U.S. Cl. X.R.

195—31 P